United States Patent
Favero et al.

(10) Patent No.: US 9,398,826 B2
(45) Date of Patent: Jul. 26, 2016

(54) INFUSION UNIT FOR DRINKS WITH HYDRAULIC CLOSING SYSTEM

(75) Inventors: Andrea Favero, Quarto d'Altino (IT); Andrea Ferraro, Salgareda (IT); Giovanni Berto, Olmi di San Biagio di Callalta (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 135 days.

(21) Appl. No.: 13/513,663

(22) PCT Filed: Dec. 14, 2010

(86) PCT No.: PCT/IB2010/055807
§ 371 (c)(1),
(2), (4) Date: Jun. 4, 2012

(87) PCT Pub. No.: WO2011/077317
PCT Pub. Date: Jun. 30, 2011

(65) Prior Publication Data
US 2013/0112084 A1    May 9, 2013

(30) Foreign Application Priority Data
Dec. 21, 2009  (IT) ................. FI2009A0268

(51) Int. Cl.
*A47J 31/36*  (2006.01)
*A47J 31/44*  (2006.01)

(52) U.S. Cl.
CPC .............. *A47J 31/36* (2013.01); *A47J 31/3633* (2013.01); *A47J 31/3685* (2013.01); *A47J 31/4467* (2013.01)

(58) Field of Classification Search
USPC .................. 99/289 R, 295, 303 P, 302 R, 283
See application file for complete search history.

(56) References Cited

U.S. PATENT DOCUMENTS

| | | | | |
|---|---|---|---|---|
| 3,583,308 A | * | 6/1971 | Williams .................... | 99/302 R |
| 4,389,925 A | * | 6/1983 | Piana .......................... | 99/289 R |
| 4,784,050 A | * | 11/1988 | Cavalli et al. ............... | 99/289 R |
| 4,941,399 A | * | 7/1990 | Zucchetti ............ | A47J 31/3619 |
| | | | | 99/289 P |
| 5,103,716 A | * | 4/1992 | Mikkelsen .................. | 99/289 R |
| 5,127,318 A | * | 7/1992 | Selby, III .................. | A23F 5/26 |
| | | | | 99/295 |
| 5,153,016 A | * | 10/1992 | Gockelmann ................. | 426/433 |

(Continued)

FOREIGN PATENT DOCUMENTS

| | | |
|---|---|---|
| EP | 0041931 A1 | 12/1981 |
| WO | 0049926 A1 | 8/2000 |

(Continued)

*Primary Examiner* — David Angwin
*Assistant Examiner* — John J Norton

(57) ABSTRACT

The infusion unit (3) comprises a moving element (9) with a seat (15) for ingredients for making said beverages, forming an infusion chamber (15) and shifting from a position for charging the ingredients to an infusion position, wherein the seat is between a hot water dispensing device (41) and a beverage outlet nozzle (35) opposite one another. The hot water dispensing device (41) comprises a cylinder-piston actuator (43, 47) fed by a first conduit (48) of water under pressure that controls a closing movement of the dispensing device (41) towards the seat (15) in infusion position. Moreover, the piston (47) of the actuator is associated to a conduit (57) of hot water under pressure. The piston exhibits a feeding chamber (55) of the hot water under pressure with an outlet port on a closing surface (53A) of the infusion chamber.

11 Claims, 12 Drawing Sheets

(56) References Cited

U.S. PATENT DOCUMENTS

| | | | | |
|---|---|---|---|---|
| 5,337,652 A * | 8/1994 | Fischer | A47J 31/32 | 99/281 |
| 5,479,848 A * | 1/1996 | Versini | | 99/287 |
| 5,598,764 A * | 2/1997 | Bambi | | 99/295 |
| 5,622,099 A * | 4/1997 | Frei | A47J 31/3671 | 99/287 |
| 5,755,149 A * | 5/1998 | Blanc | A47J 31/3623 | 99/289 T |
| 5,865,096 A * | 2/1999 | Kawabata | A47J 31/3652 | 99/283 |
| 5,911,810 A * | 6/1999 | Kawabata | A47J 31/3652 | 99/289 P |
| 6,510,783 B1 * | 1/2003 | Basile et al. | | 99/289 R |
| 6,561,079 B1 * | 5/2003 | Muller | A47J 31/36 | 99/282 |
| 6,711,988 B1 * | 3/2004 | Eugster | A47J 31/36 | 99/283 |
| 6,763,759 B2 * | 7/2004 | Denisart | | 99/302 P |
| 6,827,003 B2 * | 12/2004 | Versini | | 99/287 |
| 2008/0190297 A1 * | 8/2008 | Gussmann et al. | | 99/280 |
| 2011/0017072 A1 * | 1/2011 | Frigeri et al. | | 99/289 P |
| 2011/0146499 A1 * | 6/2011 | Magno | A47J 31/3609 | 99/302 P |
| 2012/0328739 A1 * | 12/2012 | Nocera | A47J 31/3623 | 426/77 |

FOREIGN PATENT DOCUMENTS

| | | |
|---|---|---|
| WO | 2009069167 A1 | 6/2009 |
| WO | 2009093202 A2 | 7/2009 |
| WO | WO 2009093202 A2 * | 7/2009 |
| WO | WO 2009133578 A1 * | 11/2009 |

\* cited by examiner

INFUSION UNIT FOR DRINKS WITH HYDRAULIC CLOSING SYSTEM

TECHNICAL FIELD

The present invention relates to improvements to machines for making beverages, in particular but not exclusively for making espresso coffee, and to the infusion units built in said machines.

PRIOR ART

At present there exist different types of machines for making beverages, in particular for machines for making coffee such as espresso coffee or the like, of the automatic or semi-automatic type, for household or professional use, which use single-dose coffee capsules or other ingredients for making beverages, or loose products that are first inserted into a filter or cup that is then placed into an infusion unit.

WO-A-2009/069167 describes an infusion unit for making coffee, comprising a sliding drawer, forming a moving element with a seat for single-dose capsules containing coffee powder or other ingredients for making a beverage, in particular espresso coffee. The moving element can shift from a loading position of the capsules to an infusion position, wherein the capsule seat is interposed between a hot water dispensing device and a beverage outlet nozzle, opposite to each other.

Some coffee machines, in particular in machines using infusion capsules containing coffee powders, which are inserted in a drawer system of the type described above, exhibit a system for closing the infusion chamber of the hydraulic type. A piston moved under the thrust of water under pressure presses on top of the capsule closing the infusion chamber and feeding water under pressure and at a high temperature through the same capsule for extracting the aromas from the ingredients contained therein and producing the required beverage. An example of this infusion unit with hydraulic closure of the infusion chamber is described in WO2009/093202. In this known infusion unit, the piston also comprises a water heating system and is removably constrained to a stem stiffly connected to a hydraulic piston sliding in a hydraulic cylinder forming a cylinder/piston actuator with the above hydraulic piston. This system is particularly complex and expensive to manufacture.

WO-A-00/49926 discloses an infusion unit for making drinks, comprising a moving element with a scat for single-dose pods for the preparation of drinks, partly forming an infusion chamber and movable from a pod-charging position to an infusion position. In the infusion position the seat is placed between a hot water dispensing device and a beverage outlet nozzle opposite one another. The water dispensing device includes an instant boiler with an axial duct connecting the instant boiler to an upper movable portion of the infusion chamber. The upper movable portion of the infusion chamber forms the bottom of a movable cylinder of a piston-cylinder actuator which controls closing and opening of the brewing chamber. Cold water is fed in an annular chamber formed by said axial duct connecting the instant boiler to the brewing chamber, by an outer cylindrical wall and by a bottom wall integral with said cylindrical wall and forming said upper portion of the brewing chamber. This known device is complex and expensive. Moreover, since the annular chamber of the piston-cylinder actuator is adjacent the brewing chamber, the cold water used to actuate the closure of the brewing chamber removes heat from the brewing water, which is detrimental as far as the quality of the brewed beverage is concerned.

SUMMARY OF THE INVENTION

The invention aims at totally or partly overcoming one or more of the drawbacks of the prior art.

According to some embodiments, the invention provides for an infusion unit comprising a moving element with a seat for ingredients for making the beverages, movable from an ingredient charging position to an infusion position, wherein the seat is between a hot water dispensing device and a beverage outlet nozzle, opposite one another. According to some embodiments, the dispensing device comprises a cylinder-piston actuator fed by a conduit of water under pressure but not heated, which controls the closing movement of the dispensing device towards the seat forming the infusion chamber. The actuator piston is associated to a conduit of hot water under pressure, and exhibits a feeding chamber of the hot water under pressure, with an outlet aperture on a closing surface for closing the infusion chamber.

Advantageous embodiments and preferred features of an infusion unit of this type are indicated in the annexed claims that are an integral part of the present description and shall be described in greater detail hereunder with reference to a preferred embodiment of the invention.

Hereinafter, specific reference shall be made to an infusion unit made and configured for seating single-dose capsules of coffee powder. However, it should be understood that the concepts at the basis of the invention may advantageously be used also in machines for making other types of drinks, which use an extraction system through hot water which flows through a charge of suitably dosed ingredients.

Moreover, in the following detailed description, reference shall be made to an exemplary embodiment wherein the infusion unit is made for handling single-dose capsules, for example made of a plastic material or the like, which contain coffee powder or other ingredients for making the beverage. However, it should be understood that the concepts at the basis of the invention may advantageously be used also in machines and infusion units wherein the ingredients are inserted into the machine in a different manner, for example placing them into a cup or filter, that is, in a containment member provided with a pierced wall that allows the outflow of the beverage or other food product obtained by extracting the flavours from the ingredients with hot water under pressure.

In the embodiment described hereinafter, there is also provided a particular system for washing the hydraulic circuit, which however may be not present. Moreover, the moving element for managing the capsules or other containers of ingredients for making the beverages may move between two positions only rather than three different positions, as described hereinafter with reference to the embodiment shown in the drawings.

The invention also relates to a coffee machine comprising an infusion unit of the type defined above.

BRIEF DESCRIPTION OF THE DRAWINGS

The invention will be better understood by following the description and accompanying drawing, which shows a non-limiting practical embodiment of the invention.

More in particular, in the drawing.

DETAILED DESCRIPTION OF EMBODIMENTS OF THE INVENTION

Figure 12:
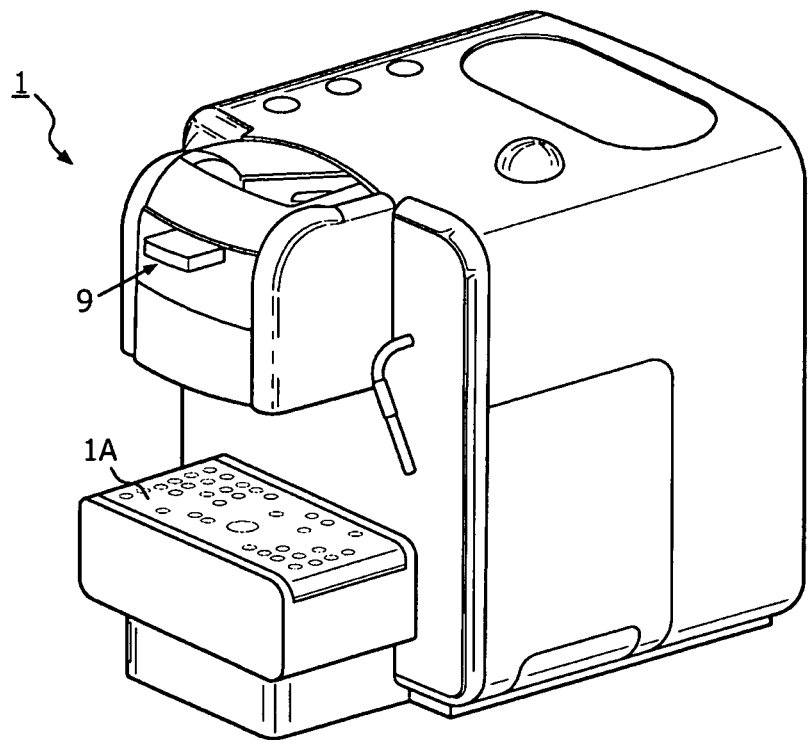
FIG. 12 schematically shows a coffee machine incorporating the infusion unit of FIGS. 1 to 10.

FIG. 12 globally indicates a coffee machine 1, wherein an infusion unit according to the invention is built in, as shall be better described hereinafter in FIGS. 1 to 10. Machine 1 comprises, in a per se known manner, a water tank, a pump for feeding the water to a boiler, wherefrom the hot water under pressure is fed to the infusion unit, described hereinafter. In a per se known manner, the water fed by the pump is also used for closing the infusion unit, as shall be better described hereinafter.

The infusion unit and its operation are illustrated in detail in the sequence of FIGS. 1 to 10.

The infusion unit, globally indicated with 3, comprises a bearing structure 5 defining side guides 7 for the sliding (according to the double arrow f9) of a moving element or unit globally indicated with 9. The moving element 9 is substantially configured as a drawer sliding along guides 7 and substantially exhibits a frame with a substantially rectangular development 11 with a wide window or central opening 13 that extends longitudinally in the direction of arrow f9. The trajectory performed by the moving element 9 is inclined relative to the horizontal for the purposes that shall be explained hereinafter.

The moving element 9 carries a seat 15 for receiving single-dose capsules C of coffee powder for making espresso coffee or similar beverages. According to some embodiments, seat 15 is delimited on the one side by a wall 15A, with a substantially semi-cylindrical development, and on the opposite side by a pair of oscillating arms 15B hinged in 17 to the moving element 9. The inside surfaces of the oscillating arms 15B and the inside surface of wall 15A laterally delimit an infusion chamber whose shape corresponds to the shape of the single-dose capsule C. The infusion chamber is completed and closed at the top and at the bottom by mechanical components described hereinafter, so as to define a closed volume wherethrough hot water under pressure is made to flow to extract the flavours contained in the single-dose capsule C.

The moving element 9 is fixed to a washing member globally indicated with 19. In some embodiments, the washing member 19 exhibits a substantially cylindrical body 21 having a top face 21A and a bottom face 21B. In some embodiments, an annular seat is made on the top face 21A for a seal 23A, whereas an annular seat is made on the bottom face for a bottom seal 23B, for the purposes described hereinafter. A conduit 25 develops through the substantially cylindrical body 21 of the washing member 19 that crosses the entire body 21 and is open on the top face 21A and on the bottom face 21B and more exactly at respective lowered zones made on said two top 21A and bottom 21B faces.

Body 21 of the washing member 19 is steadily constrained to the moving member 9 to move therewith. In some embodiments, the constraint between body 21 of the washing member 19 and the moving member 9 comprises an elastic element, for example an elastic sheet 27. In some embodiments, this elastic sheet 27 is formed integrally, with body 21 and with the moving element 9 or more exactly with frame 11 that is the main part thereof. This allows making the device with a simple plastic moulding operation. The elastic sheet 27 acts as laminar spring and allows a movement of body 21 of the washing member 19 in a direction substantially orthogonal to direction f9 of movement of the moving member 9 for the purposes described hereinafter.

In some embodiments, structure 5 exhibits a discharge opening 31 with a discharge hopper 33 developing downwards to discharge the spent capsules C. A collecting container, not shown, may be positioned underneath the discharge opening 31. Adjacent the discharge opening 31 structure 5 carries an outlet nozzle of the beverage, globally indicated with 35. The nozzle may be fitted with two side spouts that allow dispensing the coffee or other beverage in one or two cups located one adjacent the other on a plane 1A (FIG. 12) machine 1 is provided with.

In some embodiments, nozzle 35 for the beverage outlet is fitted with an outlet opening 37, preferably closed by a counter pressure valve 39 comprising for example a gate and an elastic member, in the example shown formed by a compression spring. The counter pressure valve 39 opens when the pressure of the infusion water in capsule C has reached a certain value, the valve being calibrated for obtaining particular organoleptic features of the drink.

Structure 5 carries, in a position overlying and opposite the outlet nozzle 35 of the beverage, a hot water dispensing device 41. In some embodiments, the dispensing device 41 exhibits a hydraulic closing system of the infusion chamber, as shown in the drawing. It should be understood that in other embodiments, the hot water dispensing device may be made in a different way and have for example a mechanical closing system. In the embodiment shown, the hot water dispensing device has no piercer, as it uses capsules C that need not be pierced. However, it should be understood that in other embodiments, the hot water dispensing device 41 may be provided with a top piercer to pierce capsules C at the top. In the example shown there is provided a bottom piercer to pierce the bottom surface in capsules C.

In the example shown, the hot water dispensing device 41 comprises a cylinder-piston actuator the cylinder whereof consists at least partly of a liner 43 seated in a seat 45 and locked therein by a closing flange 46. Liner 43 has a top closing wall 43A wherein a port 43B for feeding water under pressure opens. Port 43B is in connection with a chamber 43C wherein a first conduit 48 leads that feeds water under pressure fed by a pump, as shall be described hereinafter with reference to the schematic representation of the hydraulic circuit FIG. 11.

Inside the cylinder formed by liner 43, a piston 47 slides fitted with an annular seal 49 and at the top forming a pressure surface 47A. A pressure chamber with a variable volume is formed between pressure surface 47A and the inner surface of the top closing wall 43A of liner 43. Piston 47 also forms a collar 47B, surrounding a main body 47C of piston 47. About body 47C and underneath collar 47B there are arranged elastic members acting on the piston with a force opposite the force exerted by the water under pressure fed through conduit 48. In the embodiment shown, the elastic members are formed by compression springs 51 arranged about the axis of piston 47 in a suitable number, for example three or four. Springs 51 are compressed between collar 47B of piston 47 and flange 46 constrained to seat 45. Cold pressurised water fed in the chamber between pressure surface 47A and closing wall 43A of liner 43 will cause a downward movement of the piston 47 against the force of the springs 51 which will be compressed as the volume of said chamber increases.

In some embodiments, body 47C of piston 47 is constrained to a block 53 forming a chamber 55 for feeding hot water under pressure. Chamber 55 is in connection with a conduit 57 for feeding hot water under pressure coming from the boiler machine 1 is fitted with and that shall be described briefly with reference to FIG. 11. From the feeding chamber 55, the hot water reaches a dispensing opening 53B (FIG. 13) made on a bottom surface 53A of block 53, which forms a closing surface of the infusion chamber. Surfaces 53A and 47A are formed on opposed sides of the piston 47, including the piston body 47A and the block 53. Thus, the cold water flowing through conduit 48 and through port 43B into the pressure chamber of the cylinder-piston system 43, 47 is kept at a distance from the surface 53A which is in contact with the capsule C during the brewing chamber and which is in turn heated by the hot water flowing through duct 57 into chamber 55.

In some embodiments, chamber 55 for feeding the hot water and the dispensing opening 53B made on surface 53A of block 53 are in flow communication through a port 55A (FIG. 13) that is closed by a calibrated value 61 mounted on the piston 47. The calibrated valve 61 comprises a gate 63 elastically stressed by an elastic member, for example a helical compression spring 65 seated, along with gate 63, within a sliding seat formed in body 47C of piston 47. This calibrated valve 61 allows the proper operation of the hot water dispensing device 41 as shall be better clarified hereinafter with reference to the dispensing cycle. A channel 56 extends between opening 53B and port 55A visible in the section of FIG. 13, wherethrough the hot water under pressure flows when it has readed an opening pressure of the calibrated valve 61.

In some embodiments, the block formed by flange 46 and by seat 45 is fixed relative to structure 5 and an elastic element 67 is constrained thereto, for example formed by a shaped elastic sheet having the function of ejecting capsule C from seat 15, as shall be described hereinafter with reference to the infusion cycle.

Figure 1:
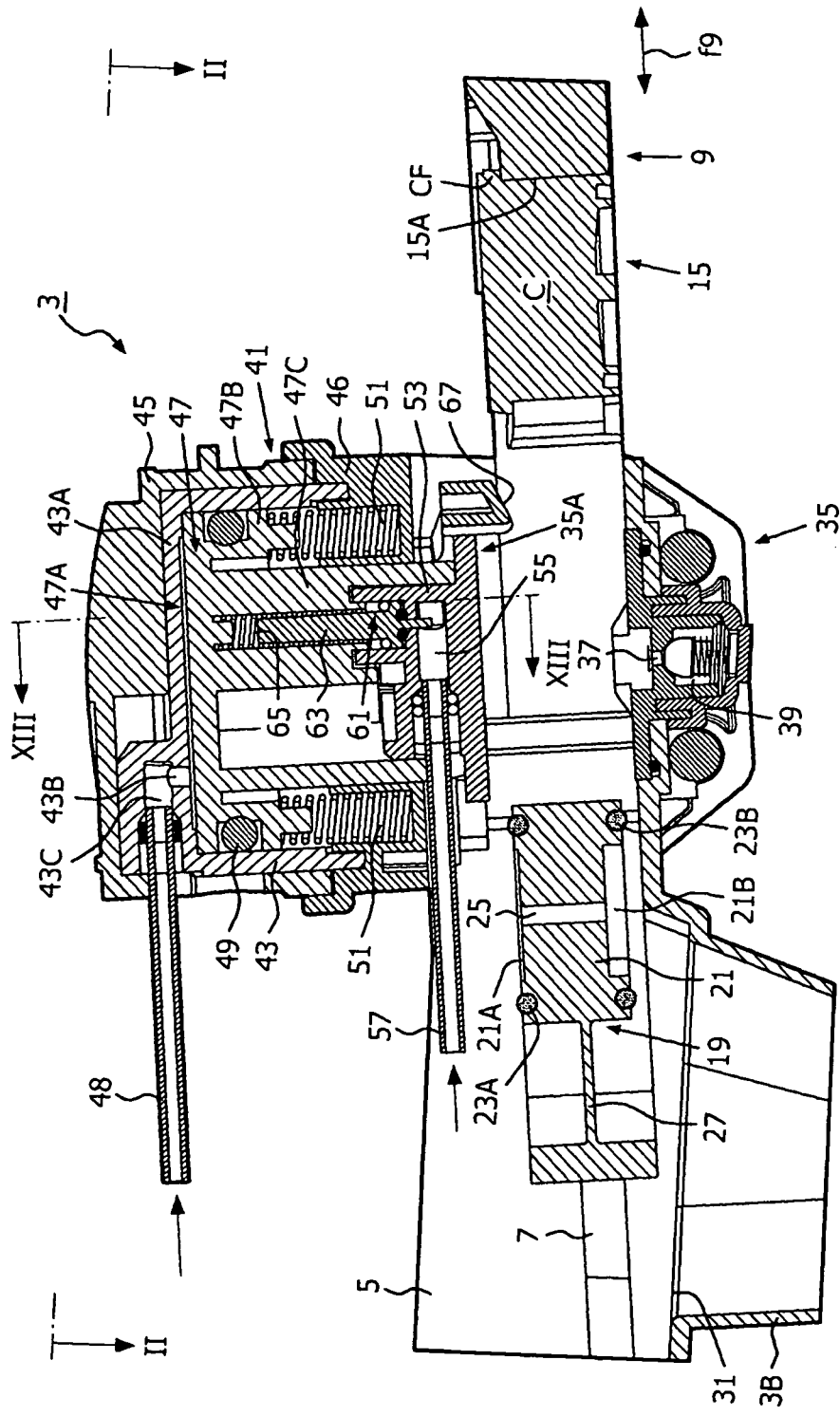
FIG. 1 shows a vertical a section according to the trace plane I-I of FIG. 2, of an infusion unit according to the invention in a position of charging a single-dose capsule.
Figure 2:
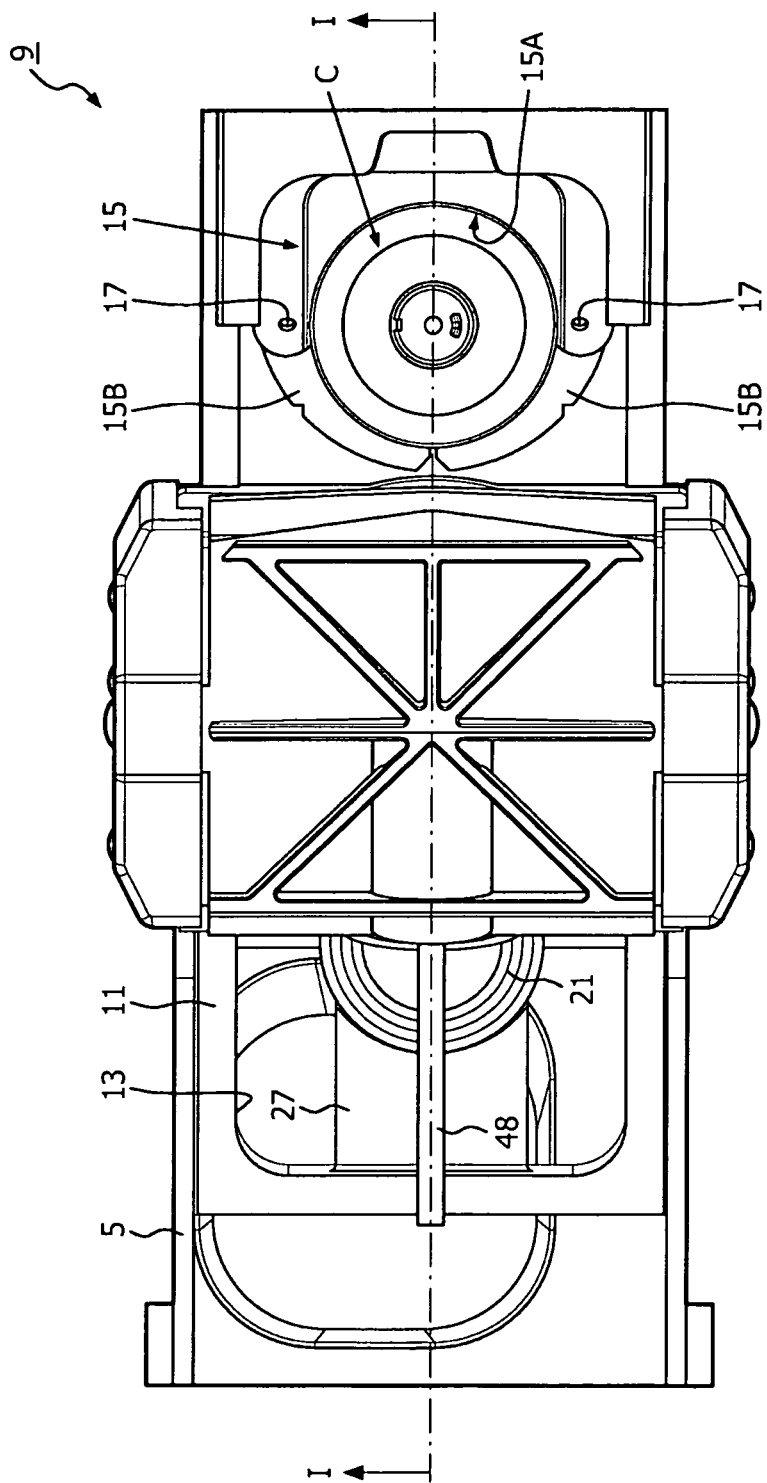
FIG. 2 shows a plan view according to II-II of FIG. 1.

The infusion unit 3 described hereinbefore operates as follows. FIG. 1 shows the position that the infusion unit takes when a new capsule C is charged into seat 15. The moving element or sliding drawer 9 is in a charging position, so as to be accessible to the user from outside machine 1. In this way it is easy to insert capsule C into the seat formed between the oscillating arms 15B and the fixed wall 15A constrained to the moving element 9.

Figure 3:
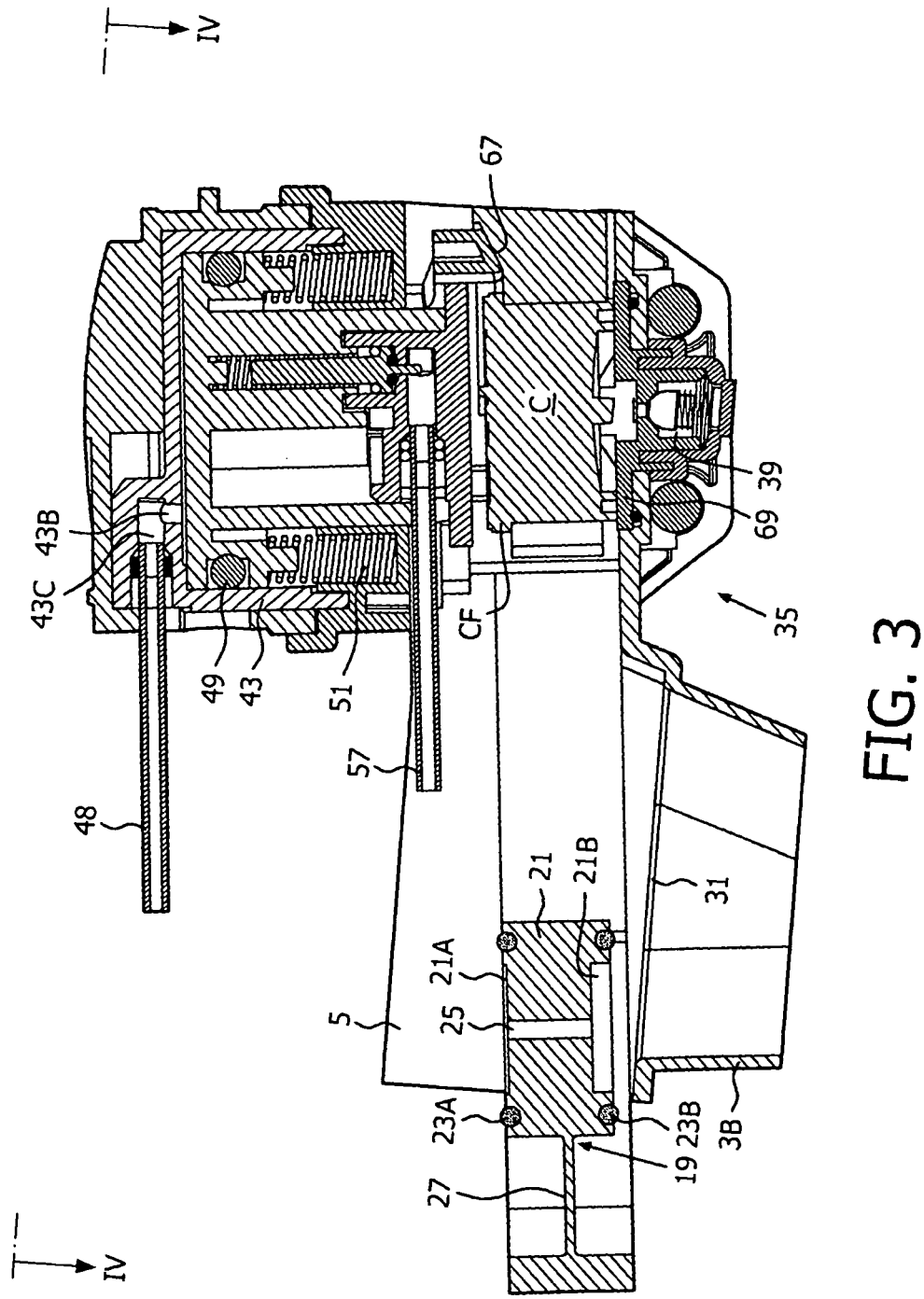
FIGS. 3 and 4 respectively show a section according to a vertical plane of trace III-III in FIG. 4 and a plan view according to IV-IV of FIG. 3 of the infusion unit in the infusion position before closing the infusion chamber.
Figure 4:
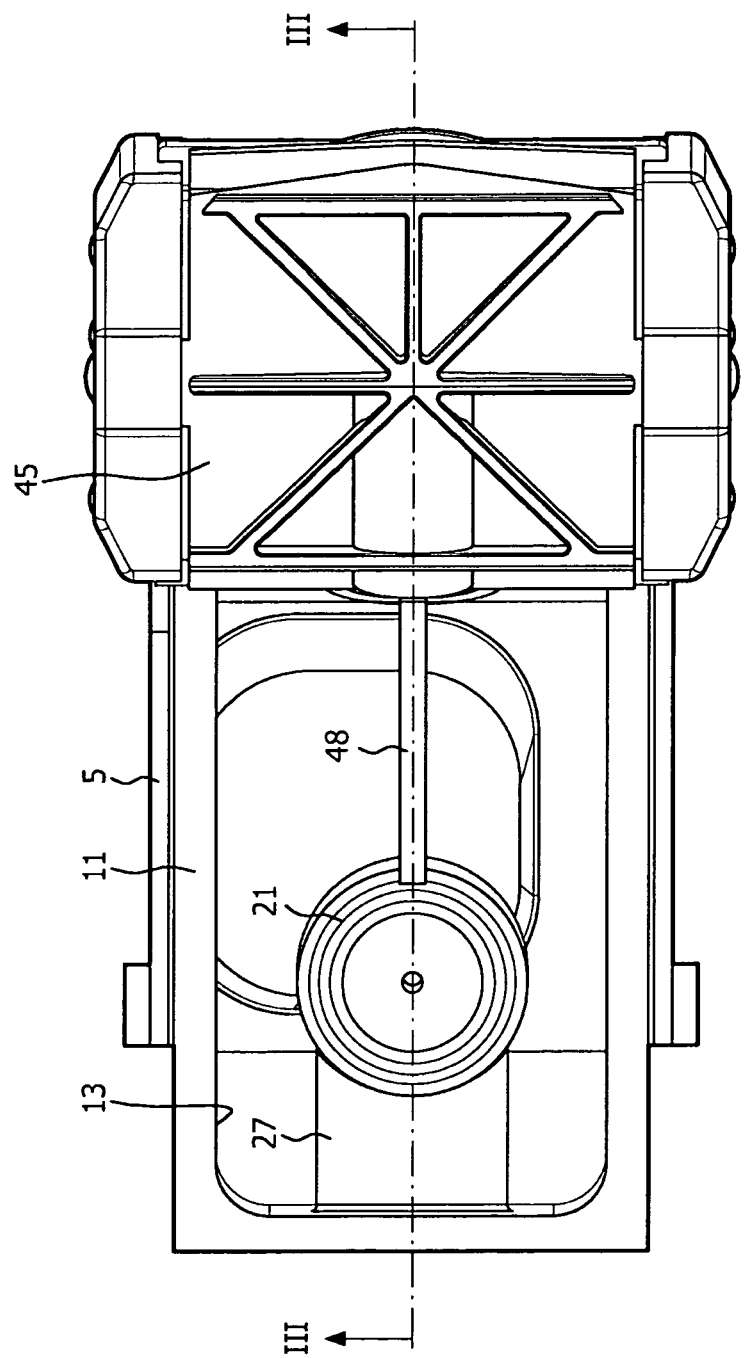

In the next step, shown in FIGS. 3 and 4, the moving element or drawer 9 is pushed within the machine up to moving seat 15 in alignment with the hot water dispensing device 41 and with the beverage outlet nozzle 35. In this position, capsule C is arranged with its bottom in contact with a disc 69 defining the bottom wall of the infusion chamber, the side walls thereof being formed by arms 15B and by wall 15A. As is seen by comparing FIGS. 1 and 3, capsule C has been brought to its infusion position (FIG. 3) going beyond the elastic clement 67 which in rest condition, is at a lower height than the top flange CF of capsule C in infusion position. This is made possible by the elasticity of the elastic element 67 and by the chamfered shape thereof that allows, under the effect of the thrust given by the moving element 9, the lifting of the elastic movement 67 and the overtaking of the latter by capsule C.

In the position of FIG. 3 the hot water dispensing device 41 is actuated feeding water under pressure in the cylinder formed by liner 43. The compression pushes wall 47A of piston 47 downwards causing the compression of springs 51 and thus the lowering of surface 53A against the top surface of capsule C in this way defining the top closing wall of the infusion chamber. The latter therefore remains formed by the bottom closing wall or surface 53A constrained to piston 47, by arms 15B, by wall 15A and by the wall formed by disc 69 associated to the drink outlet nozzle 35.

The hot water under pressure fed through conduit 57 acts on the calibrated valve 61 to cause the opening thereof through the compression of spring 65 and upwards sliding of the cursor or gate 63, so as to put the hot water dispensing opening 53B in communication with the hot water feeding chamber 55. Valve 61 is calibrated so that the opening pressure is sufficiently high to ensure an adequate brewing pressure in capsule C, but sufficiently limited to ensure an adequate seal between the closing surface 53A and the top face or surface of capsule C. In some embodiments, the hot water under pressure fed to chamber 55 and the water under pressure fed to the cylinder-piston actuator 43, 47 is provided by the same pump and therefore it has about the same pressure value in the two chambers. It is therefore necessary to calibrate valve 61 considering the pressure at which the flavour extraction from the ingredients contained in capsule C must be carried out, the value of the closing force to be exerted on capsule C by the cylinder-piston actuator and the area of surfaces 47A and 53A. In other embodiments, a check valve on water duct which feeds the boiler will keep the water pressure in the hot water conduit 57 lower than the water pressure in the cold water conduit 48, as will be described later on, such that upon opening of valve 61 a pressure difference still exists between the cold and hot water ducts respectively, said pressure difference, in combination with the surface on which the pressure is applied, ensures proper closure of the brewing chamber under sufficient brewing pressure in the capsule.

In FIG. 3, the infusion unit is shown in the position immediately before the activation of the dispensing device 41, with the infusion chamber closing surface 53A still at a certain distance relative to the top surface of capsule C. It should be understood that the infusion occurs when piston 47 has lowered up to bringing surface 53A to press against the top surface of capsule C.

At the end of the drink dispensing, piston 47 is returned to the rest position by the effect of springs 51 and discharging the pressure into the circuit that feeds conduit 48 and conduit 57, so that also valve 61 closes.

Figure 5:
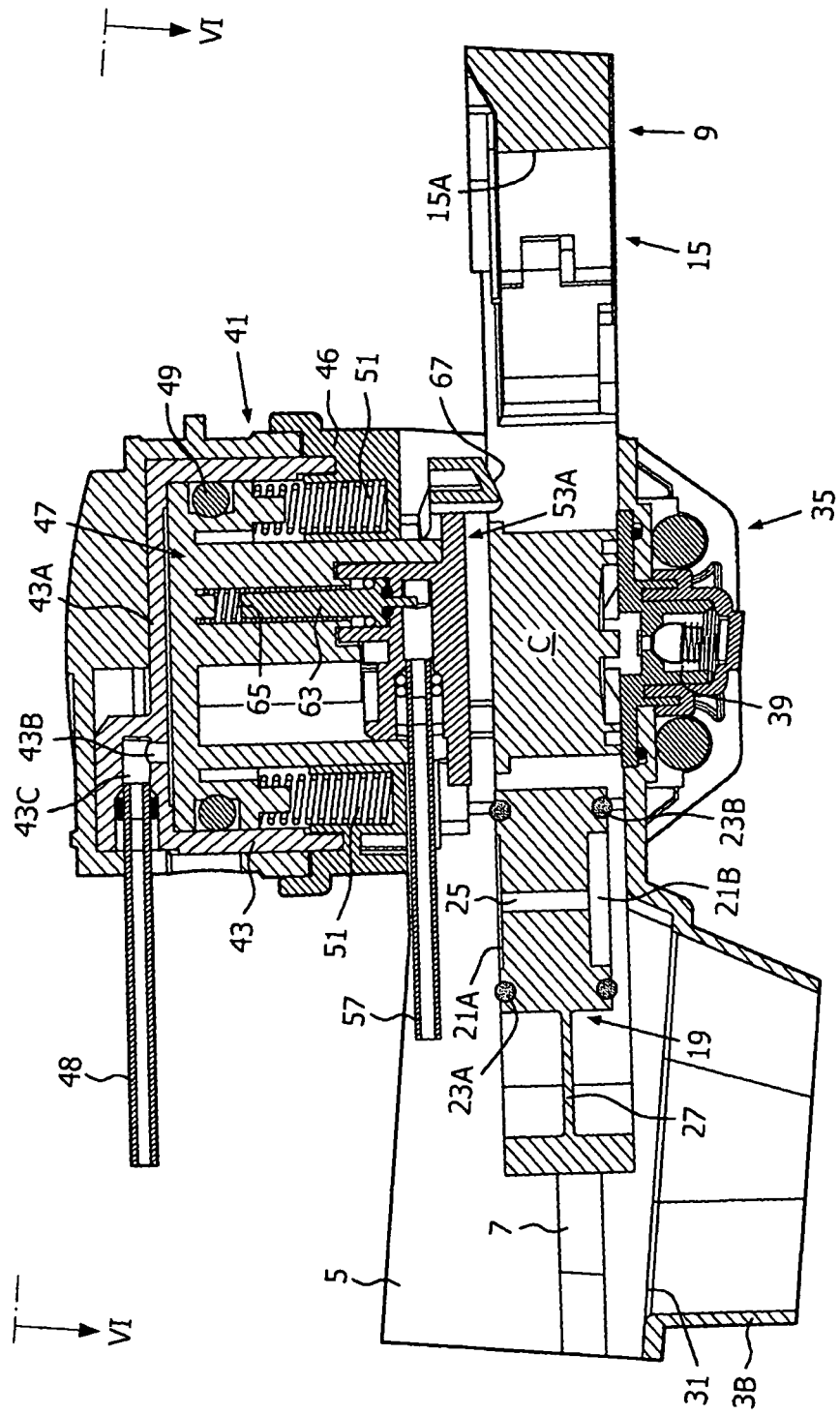
FIGS. 5 and 6 show a section according to V-V in FIG. 6 and a plan view according to VI-VI of FIG. 5 of the same infusion unit in the step subsequent to an infusion cycle.
Figure 6:
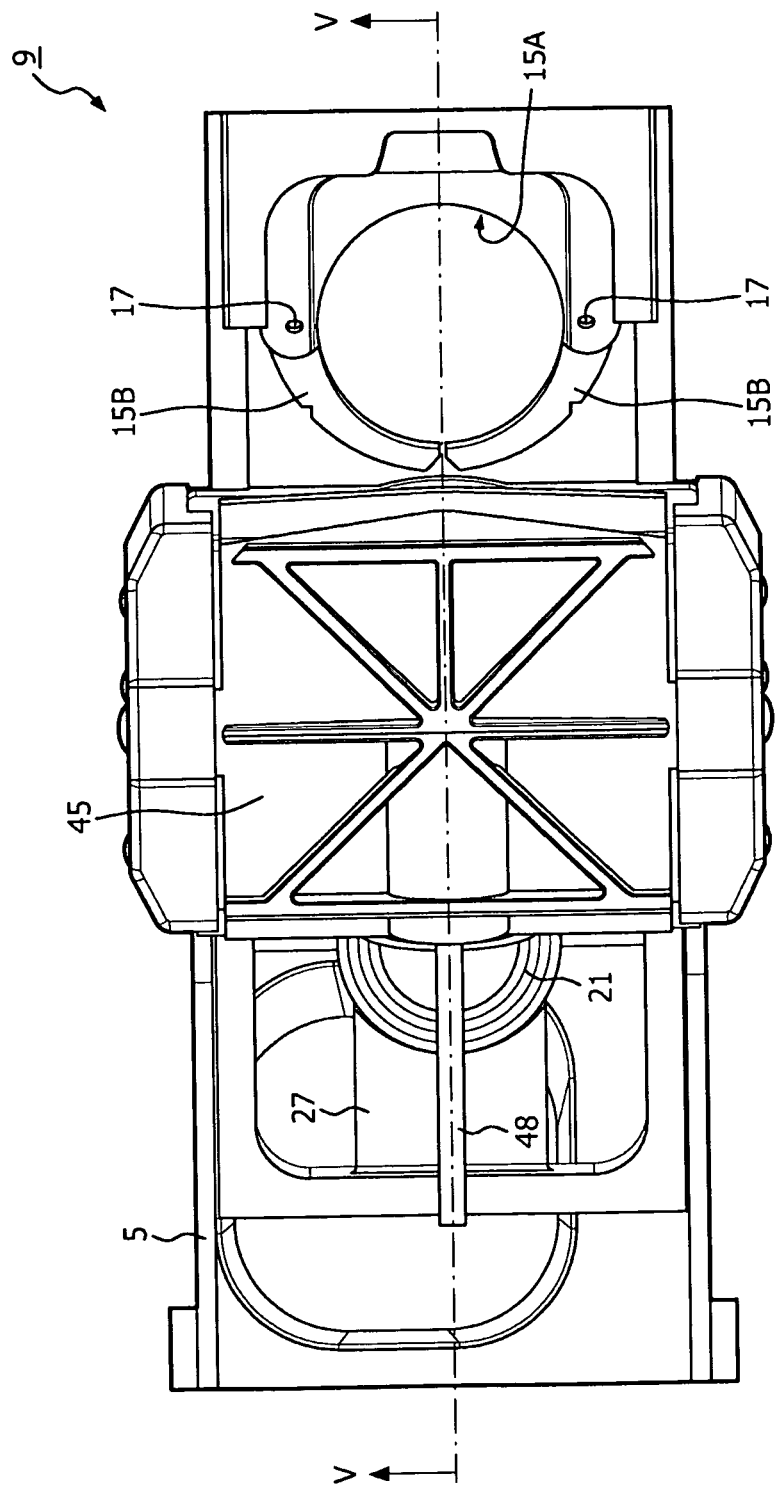
Figure 7:
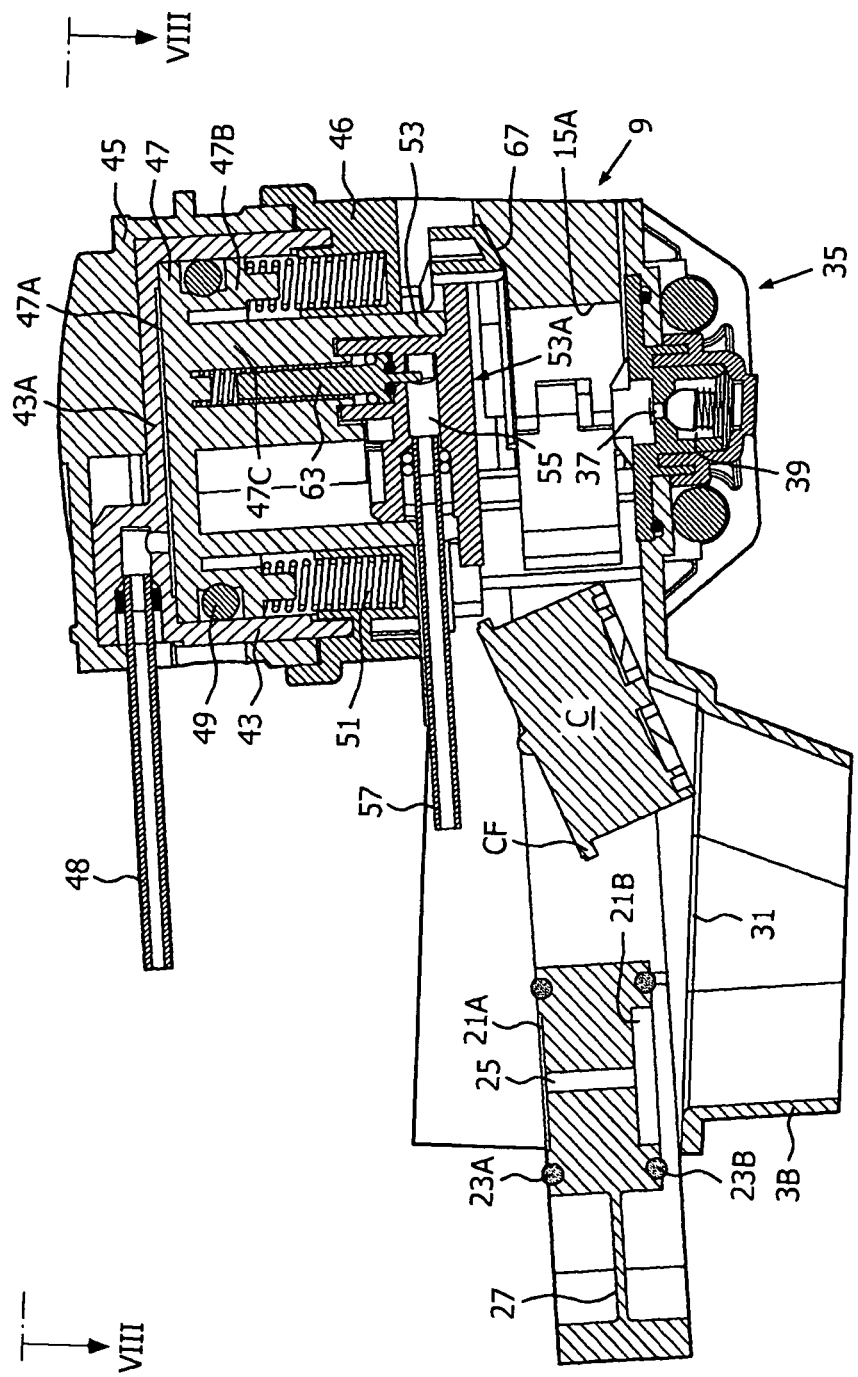
FIGS. 7 and 8 show a section according to VII-VII and a plan view according to VIII-VIII of the infusion unit in the step of ejection of an empty single-dose capsule.
Figure 8:
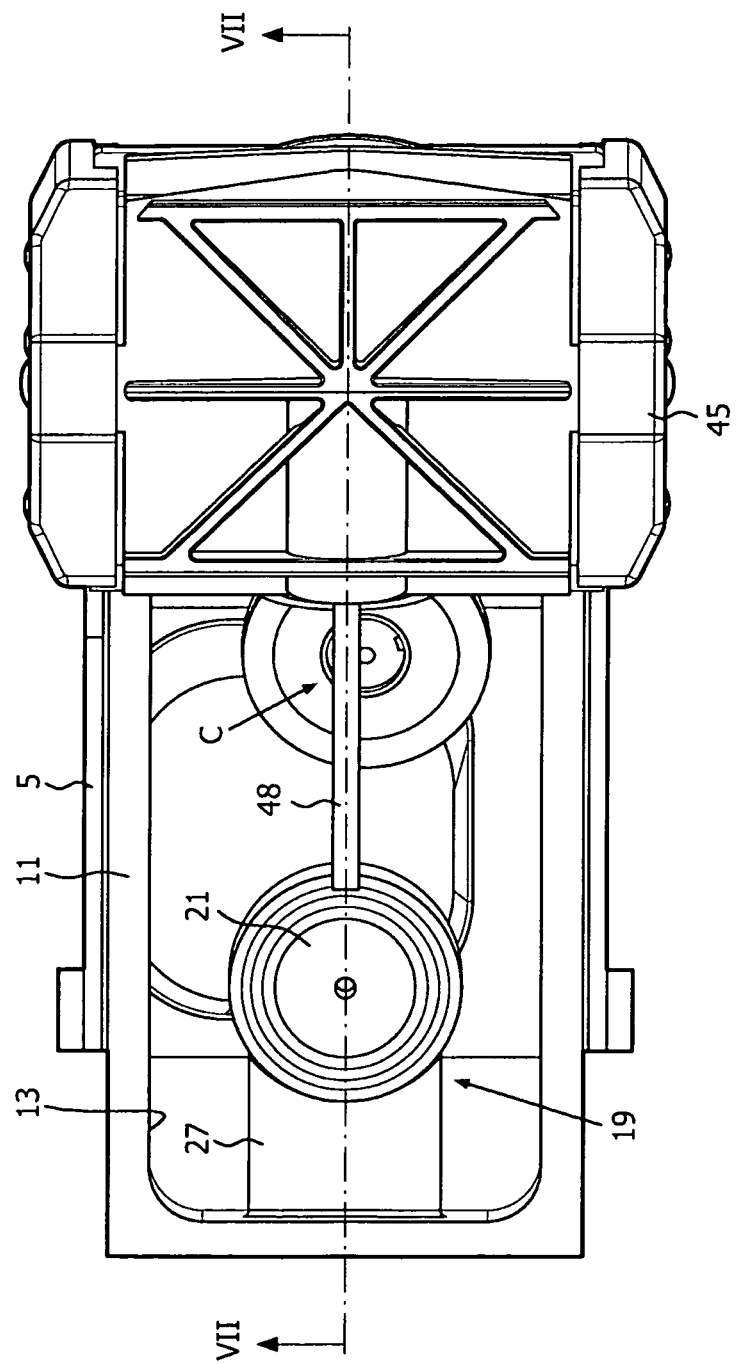

Once pressure has been discharged, the moving element or drawer 9 is again moved to the loading position of a new capsule, as shown in FIGS. 5 and 6. During this return movement of the moving element 9, the elastic element 67 retains the spent capsule C, that is, just used in the infusion cycle that has just ended, in the infusion position, interposed between the hot water dispensing device 41 and the drink outlet nozzle 35. This empty capsule is discharged at the next infusion cycle, or with a loadless inwards movement of the moving element 9, as shown in FIGS. 7 and 8. In this movement, arms 15B push the spent capsule C away from its infusion position bringing it towards the discharge opening 31. The inclination of the path (arrow f9) of the moving element 9 favours the discharge of the spent capsule and also the optional outflow towards discharge opening 31 of liquid that optionally remains in the infusion zone. The opening and closing movement of the elastic arms 15B for allowing the outlet of the empty capsule C and the subsequent ejection by thrust may be obtained by known systems, for example of the type described in WO-A-2009/069167.

Figure 9:
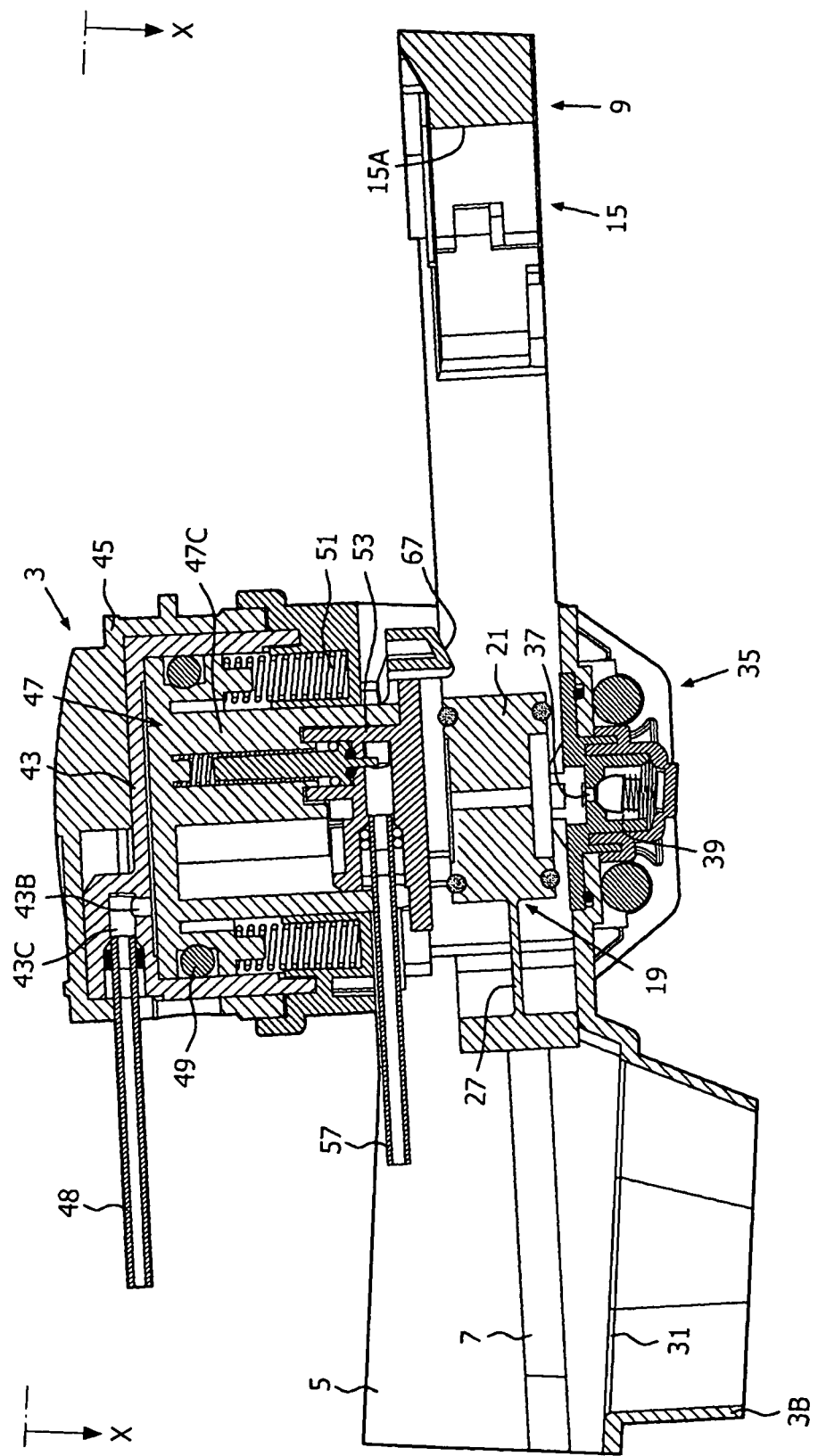
FIGS. 9 and 10 show a cutaway view according to a vertical plane IX-IX of FIG. 10 and according to a plan view according to X-X of FIG. 9 of the infusion unit in a washing step.
Figure 10:
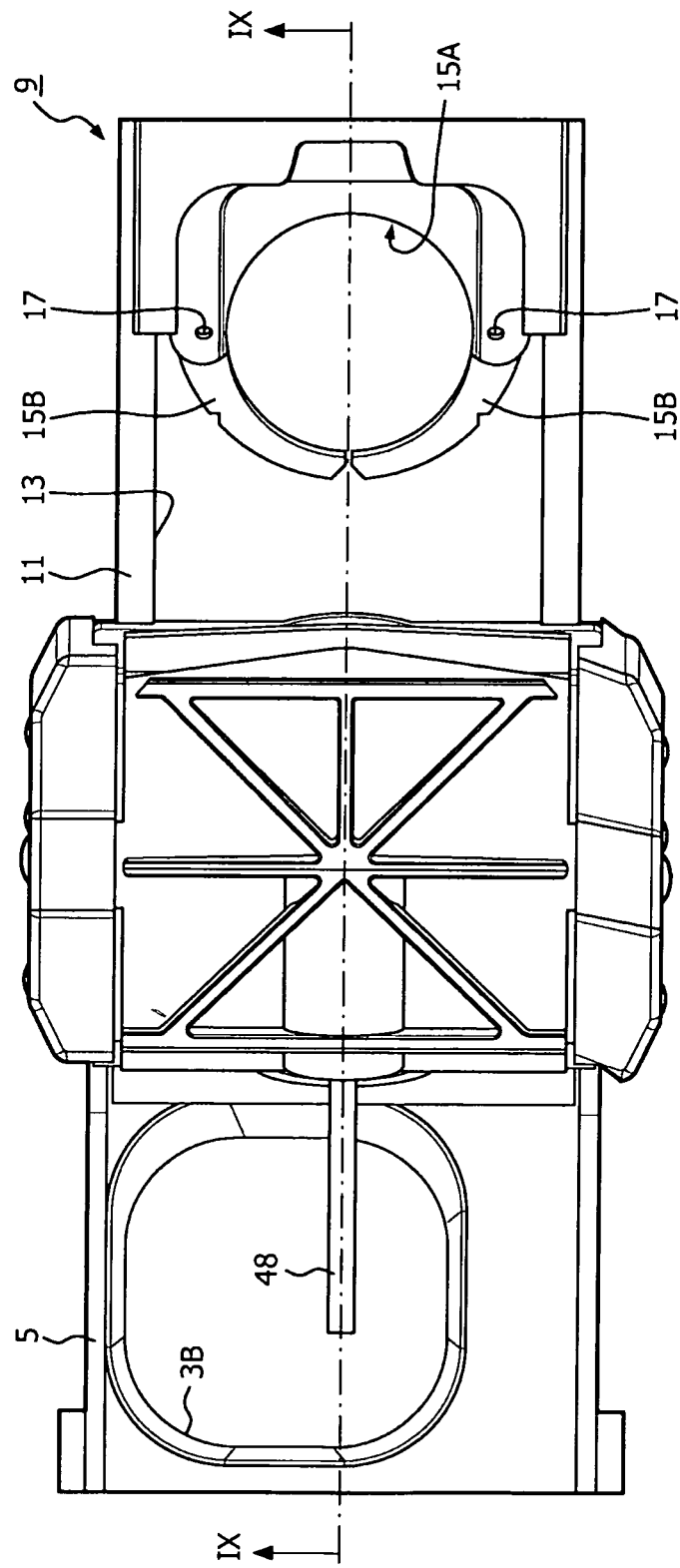

To carry out a washing cycle, the moving element 9 is brought to the position shown in FIGS. 9 and 10. With an extra-stroke outwards, the moving element 9 reaches such position that the washing member 19 is interposed between the drink outlet nozzle 35 and the hot water dispensing device 41, moving to the position normally taken by a capsule C.

Once this position has been reached, the hot water dispensing device 41 closes pushing piston 47 downwards until the bottom surface 53A of block 53 integral to piston 47 presses against the top face or surface 21A of body 21 of the washing member 19. The latter is pushed downwards with a bending of sheet 27 up to press the annular seal 23B against plate 69 surrounding the outlet port 37 of the beverage outlet nozzle 35. A sealed passage is thus formed that extends from the water dispensing opening 53B made on surface 53A up to port 37 and hence through the drink outlet nozzle 35, up to the drink dispensing spouts (not shown). By feeding hot water under pressure through conduit 57 it is so possible to wash the entire circuit downstream of surface 53A, removing any residues or deposits formed during the previous dispensing cycles.

The movement of the moving element 9 can be obtained in any way. According to some embodiments, the movement is controlled manually for example by thrust, with a lever actuated by the user, or through an actuator, for example a hydraulic, pneumatic, electrical or similar actuator. In some embodiments it is possible to provide a pinion and rack mechanism, with a rack constrained to frame 11 of the moving element 9 and a pinion actuated by an electrical motor, not shown. The moving element 9 may be associated to microswitches for detecting its position during the various steps of the infusion or washing cycle, for providing the consensus to the dispensing of hot water under pressure.

Figure 11:
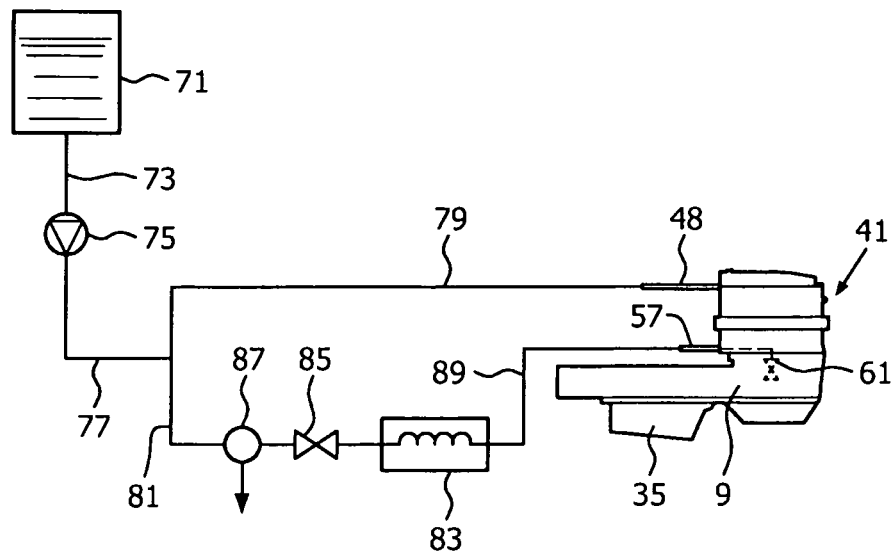
FIG. 11 schematically shows some components of the hydraulic circuit associated to the infusion unit.

FIG. 11 schematically shows some components of the hydraulic circuit of machine 1. This figure shows a water tank 71 with an outlet conduit 73, whereon a feeding pump 75 is placed. Pump 75 feeds at an adequate pressure, for example between 8 and 12 bar, typically and preferably between 10 and 15 bar, the water collected from tank 71 towards the feeding conduit 77. The latter branches into a conduit 79 connected to conduit 48 described above for feeding the water under pressure provided by the pump 75 to the cylinder-piston actuator 43, 47. Reference numeral 81 indicates a second branching of conduit 77 that feeds a boiler 83. Boiler 83 may advantageously be an instant boiler, or a storage boiler. Along conduit 81 there is arranged a check valve 85 and a discharge valve 87 for discharging the pressure from the circuit at the end of the infusion cycle. From boiler 83, the hot water under pressure is fed to a conduit 89 connected to conduit 57 described above, for feeding the hot water to chamber 55.

From this brief description of the hydraulic circuit it is understood that a single pump 75 feeds water under pressure to both the closing actuator 43 and 47 of the infusion unit, and to the boiler that provides the water at the adequate pressure and temperature to the feeding chamber 55. At the end of the infusion cycle, the pressure in the circuit between pump 75 and the infusion unit 41 is discharged by opening valve 87. The check valve 85 prevents the outflow of water from boiler 83 towards the discharge and the calibrated valve 61 prevents the outflow of water towards the infusion zone. The arrangement of the calibrated valve 61 into the infusion unit prevents the need of a further check valve downstream of the boiler.

The check valve 85 can be calibrated such that the water supplied by the pump 75 is fed at a first, higher pressure to the cold water conduit 48 and at a second, lower pressure to the boiler 83 and to the infusion chamber. For example, valve 85 can be calibrated to maintain a 2 Bar pressure difference between the cold water conduit 48 and the hot water conduit 57.

Figure 13:
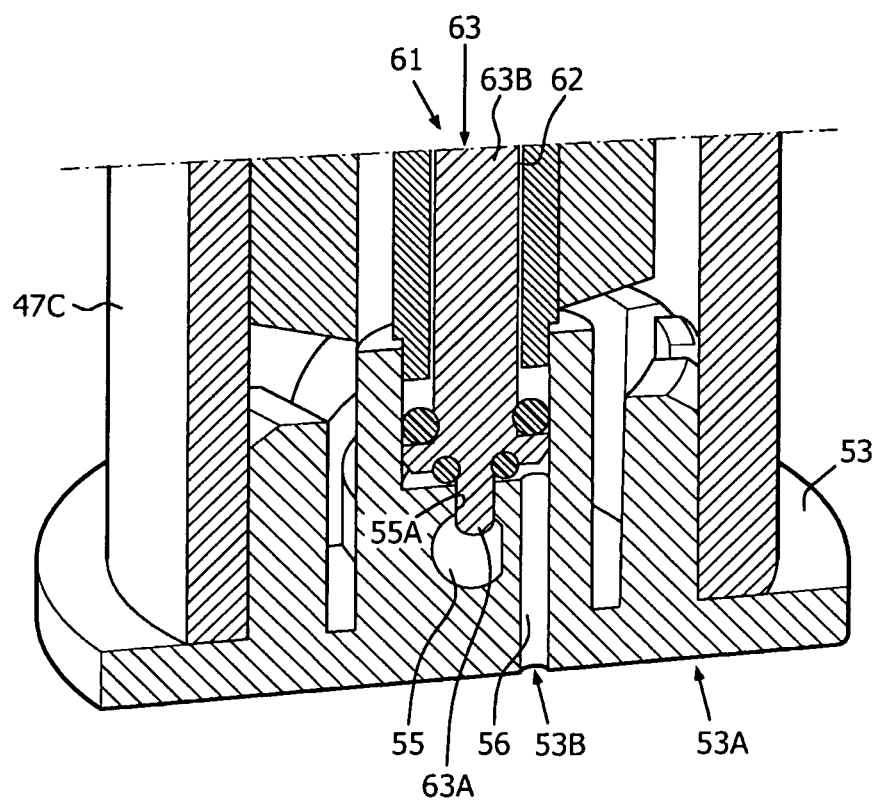
FIG. 13 shows a section according to a trace plan of FIG. 1 of the dispensing device of the water under pressure in the infusion chamber.

As shown in FIG. 13, the calibrated valve 61 is designed such that it opens at a pre-set pressure value and causes only a negligible loss of pressure in the water flowing there through. Gate 63 is slidingly housed in a sliding seat 62 and is provided with a front stem 63A sealingly engaging aperture 55A. The cross-section of front stem 63A is smaller than the cross-section of body 63B of gate 63. As soon as the pressure on the front surface of the stem 63A overcomes the force of the spring 65, gate 63 retracts and opens aperture 55A. The water can thus flow through aperture 55A, channel 56 and dispensing opening 53B. Since the cross-section of body 63B of gate 63 is larger than the cross-section of front stem 63A thereof, once the valve 61 opens the pressure force exerted by the water on the gate will increase abruptly and will maintain the spring 65 entirely compressed, thus completely opening the flow passage for the hot water.

It is understood that the drawing shows just one example, provided merely as a practical demonstration of the invention, which can vary in its forms and arrangements, without however departing from the scope of the concept underlying the invention. Any reference numbers in the appended claims are provided to facilitate reading of the claims with reference to the description and to the drawing, and do not limit the scope of protection represented by the claims.

The invention claimed is:

1. An infusion unit for making drinks comprising:
   a moving element with a seat for ingredients for making said drinks, said seat forming an infusion chamber and being movable from an ingredient-charging position to an infusion position, wherein in said infusion position said seat is positioned between a hot water dispensing device and a beverage outlet nozzle opposite one another, wherein said dispensing device comprises:
   a cylinder-piston actuator fed by a first conduit of cold water under a first pressure, wherein said cold water under said first pressure controls a closing movement of said dispensing device towards said seat in said infusion position;
   said cylinder-piston actuator including:
   an outer cylinder;
   a piston sliding in said outer cylinder, said piston being in fluid communication with hot water under a second pressure through a second conduit, said first pressure being greater than said second pressure; and a hot water feeding chamber with a hot water dispensing opening on a closing surface of said infusion chamber arranged at a first side of said piston;

said piston comprising:

a body defining a pressure surface, said pressure surface being arranged on a second side of said piston opposite said first side;

elastic members, in contact with said first side, positioned about said outer cylinder, said elastic members providing a force opposing said first pressure applied to said piston; and a valve mounted on said piston at said hot water dispensing opening, wherein said valve on said piston is configured to open when said second pressure in said hot water feed chamber achieves a desired pressure level based on the drink being prepared.

2. The infusion unit according to claim 1, wherein a block forming said hot water feed chamber is arranged opposite said pressure surface, said block defining said closing surface.

3. The infusion unit according to claim 2, wherein said central body of said piston comprises a seat for said block forming the hot water feeding chamber.

4. The infusion unit according to claim 1, wherein said cylinder-piston actuator is a single-acting cylinder-piston, said elastic members returning the piston to a retracted position.

5. The infusion unit according to claim 1, wherein said elastic means is arranged in said cylinder between said body of said piston and said cylinder as well as between said closing surface of said infusion chamber and said pressure surface of said piston.

6. The infusion unit according to claim 1, wherein the cylinder of said cylinder-piston actuator at least partially consists of a cylindrical liner wherein the piston is slidingly seated, said piston including:

a collar; and a central body with a smaller diameter than said collar, said central body having a side whereupon said elastic means are retained between said collar and a closing flange central to said liner.

7. The infusion unit according to claim 1, where said elastic means comprises:

a plurality of compression springs.

8. The infusion unit according to claim 1, wherein said valve includes:

a gate comprising a front stem sealingly engaging an aperture connecting said hot water feeding chamber and said hot water dispensing opening, said front stem having a smaller cross section than a body of said gate, said gate being slidingly engaged in a sliding seat; and a compression spring acting on said gate opposite said front stem.

9. A coffee machine comprising:

a water tank;

a pump;

a boiler; and an infusion unit comprising:

a moving element with a seat for ingredients for making said drinks, said seat forming an infusion chamber and being movable from an ingredient-charging position to an infusion position, wherein in said infusion position said seat is positioned between a hot water dispensing device and a beverage outlet nozzle opposite one another, wherein said dispensing device comprises:

a cylinder-piston actuator fed by a first conduit of cold water under a first pressure from the water tank, said cold water controlling a closing movement of said dispensing device towards said seat in said infusion position;

said cylinder-piston actuator including:

an outer cylinder;

a piston sliding in said outer cylinder, said piston being in fluid communication with hot water under a second pressure through a second conduit from the boiler, said first pressure being greater than said second pressure; and a hot water feeding chamber with a hot water dispensing opening on a closing surface of said infusion chamber arranged at a first side of said piston;

said piston comprising:

a body defining a pressure surface, said pressure surface being arranged on a second side of said piston opposite said first side;

elastic members, in contact with said first side, positioned about said outer cylinder, said elastic members providing a force opposing said first pressure applied to said piston; and a valve mounted on said piston at said hot water dispensing opening, wherein said valve on said piston is configured to open when said second pressure in said hot water feed chamber achieves a desired pressure level based on the drink being prepared.

10. The coffee machine according to claim 9, including a check valve arranged between said pump and said boiler.

11. The coffee machine according to claim 10, wherein said pump feeds water to a first feeding conduit which branches into a second conduit connected to said cylinder-piston actuator and to a third conduit that feeds said boiler, said check valve being arranged on said third conduit.

* * * * *